United States Patent [19]

Hölscher

[11] 4,296,918
[45] Oct. 27, 1981

[54] ANIMAL PEN POST

[75] Inventor: Werner Hölscher, Emsbüren, Fed. Rep. of Germany

[73] Assignee: Hölscher & Leuschner GmbH & Co., Emsbüren, Fed. Rep. of Germany

[21] Appl. No.: 147,003

[22] Filed: May 6, 1980

[30] Foreign Application Priority Data

May 15, 1979 [DE] Fed. Rep. of Germany ....... 2919414
May 15, 1979 [DE] Fed. Rep. of Germany ... 7913963[U]

[51] Int. Cl.³ ............................................. E04H 17/14
[52] U.S. Cl. ....................................... 256/68; 256/19; 256/54; 119/20
[58] Field of Search ........................ 256/19, 69, 68, 66, 256/50, 51, 48, 55, 54, 65, 72, 60, 61, 62, 59, 70, 71; 119/20

[56] References Cited

U.S. PATENT DOCUMENTS

| 768,012 | 8/1904 | Chamberlin | 256/51 |
| 987,303 | 3/1911 | Keller | 256/50 UX |
| 1,200,166 | 10/1916 | Carpenter | 256/55 |
| 1,501,665 | 7/1924 | James | 256/55 |
| 4,142,711 | 3/1979 | Brimhall | 256/65 |

FOREIGN PATENT DOCUMENTS

| 85330 | 8/1921 | Austria | 256/69 |
| 497156 | 9/1919 | France | 256/65 |

Primary Examiner—Andrew V. Kundrat
Attorney, Agent, or Firm—Jordan and Hamburg

[57] ABSTRACT

A post is made in one piece with at least two outwardly facing longitudinal surfaces of the post which are adjacent to one another and which extend generally in planes disposed at right angles with respect to one another formed with means for receiving and seating horizontal rails. Holes are provided for securing means to secure the rails to the seats. The seating means are offset in height in the two surfaces respectively so that rails can be secured to the post in crossing relation if desired.

2 Claims, 3 Drawing Figures

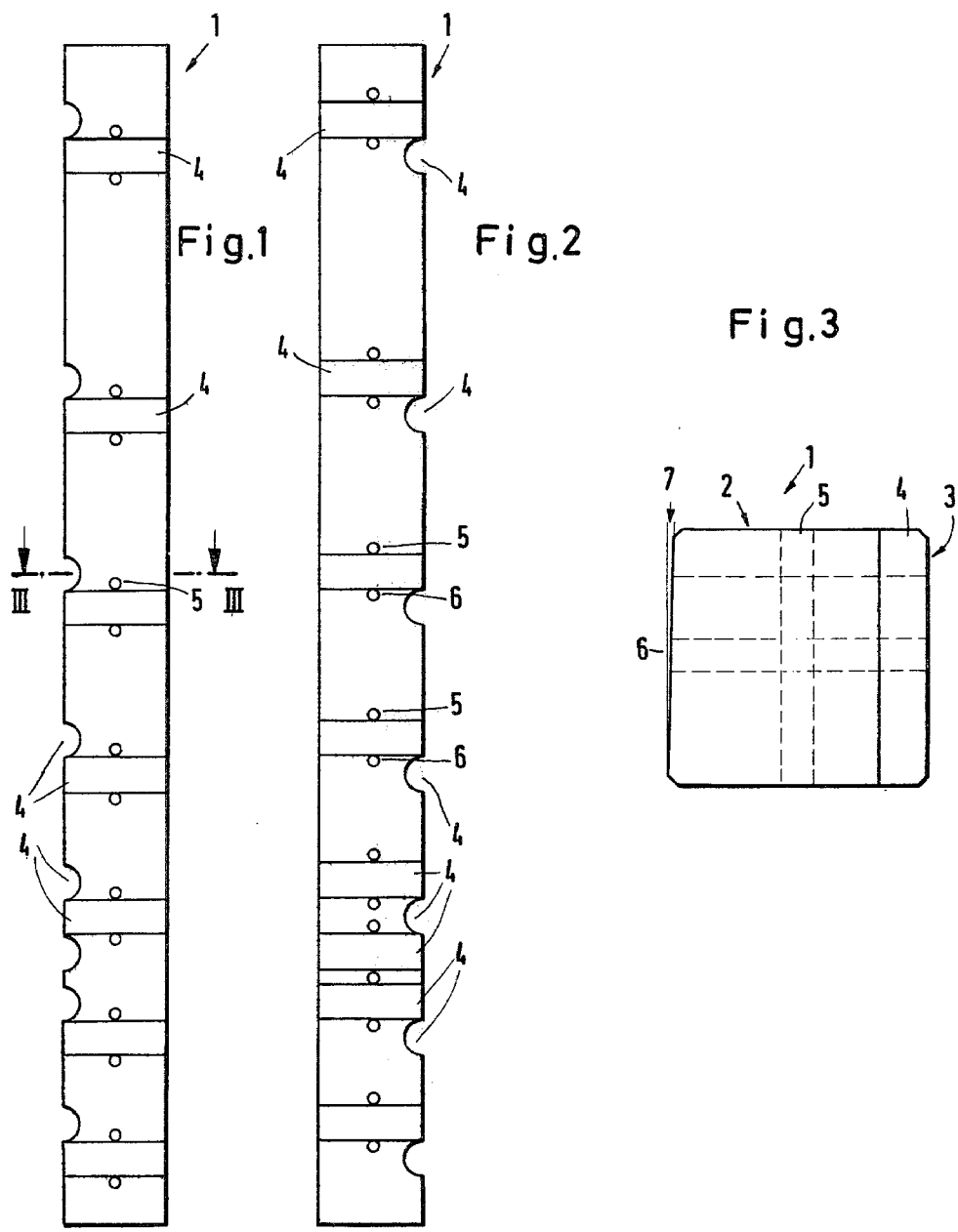

ANIMAL PEN POST

BACKGROUND OF THE INVENTION

The invention relates to a new and improved post for animal pens which can be installed in a livestock shed for example, wherein the walls of the pens comprise horizontal tubes or struts, the post consisting of nonmetallic material such as concrete which cannot rot.

DESCRIPTION OF THE PRIOR ART

Belgium patent specification No. 714,043 describes a post for animal pens which is divided longitudinally into two halves having the same cross-section, the post being adapted to grip the horizontal tubes or struts between the halves of the post. To this end, the halves of the post comprise, at their surfaces facing one another, recesses at both sides which join to form passages for the horizontal tubes and this enables the tubes to be located positively when the halves of the post are connected to one another.

Such a post has various disadvantages in production and assembly. A divided post is either relatively weak or expensive in material and consequently heavy if it is to achieve a required, predetermined strength. As a result of dividing the post longitudinally into two halves there are double the number of individual parts to be handled and these individual parts must fit together precisely in pairs. It is a particular disadvantage that during assembly, the halves of the post can only be connected to one another finally when all the horizontal members have been positioned relative to the post, so that assembly, progressing step-by-step, or a subsequent alteration, is difficult to carry out. The arrangement of the horizontal members between the two halves of the post makes access to them difficult. Furthermore, the arrangement makes it difficult to secure horizontal members in two directions at right angles when constructing rectangular pens. For this purpose, German patent specification No. 714,043 describes the use of a plurality of posts or post portions which are anchored together in a complicated manner at the corners.

SUMMARY OF THE INVENTION

It is the object of the invention to provide a post for an animal pen or the like which is simple to produce, easy to handle and easy to use.

According to the invention, the problem is solved in that the post is made in one piece, the means for receiving the horizontal members are situated at the outside of the post, these means being open towards the outside of the post at least at two longitudinal surfaces of the post which are adjacent to one another and which extend generally in planes disposed at right angles with respect to one another, and for each such means, at least one receiving hole for a securing element is formed in the post for securing a horizontal member to the receiving means.

The post thus formed also enables the horizontal members forming the pen walls to be located positively, that is to say, a rigid connection results between the horizontal members and the posts. For this purpose, a plurality of post parts do not have to be handled and assembled at each side of the horizontal members. All that is required is a lateral connection between the horizontal members and the posts. The external arrangement of the horizontal members on the posts also enables individual horizontal members to be detached, if necessary, without major disassembly and re-assembly.

In particular, however, it is possible, in the simplest manner, to connect horizontal members extending at right angles to a single post at their crossing point, in that the post has receiving means for horizontal members formed at two external surfaces of the post which are adjacent to one another. Precisely by this means, it is possible to achieve a high rigidity for the whole arrangement of horizontal members extending crosswise with respect to one another and the posts directly connected to them.

The post of the invention is simple to produce and is transported in one piece. No requirement to store parts in pairs for subsequent assembly as with the known divided posts, occurs, nor the necessity to construct complex units at the crossing points of the horizontal members when pens are erected using the posts.

BRIEF DESCRIPTION OF THE DRAWINGS

The above further novel features and advantages of the invention will become apparent from the following detailed description of the preferred embodiment of the invention given with reference to the accompanying drawings in which:

FIG. 1 is a view of a post, according to the invention,

FIG. 2 is a side view, from the left, of the post shown in FIG. 1 and

FIG. 3 is a section on line III—III in FIG. 1.

DETAILED DESCRIPTION OF THE PREFERRED EMBODIMENT

With reference to the accompanying drawings, the post illustrated in the drawings and designated as a whole by the reference numeral 1 is cast from concrete and has a substantially prismatic shape with a substantially square cross-section. Of the four lateral faces of the post, two faces 2, 3, that is to say the faces shown in FIGS. 1 and 2, are shaped to contact horizontal rails in the form of tubes. For this purpose, the surfaces 2, 3 each present a series of tube receiving means or recesses 4 of corresponding shape and dimensions distributed over the height of the post. The tube receiving means 4 are shaped as half-cylindrical recesses, open at both ends, so as to fit the tubes which are to be received in them so that the latter have a firm seating in the recesses with one half of their outside periphery.

Associated with each tube receiving means or recess 4 is a pair of receiving holes, namely an upper receiving hole 5 and a lower receiving hole 6, both of which are situated immediately adjacent to the tube receiving means 4 and which traverse the post centrally. This pair of receiving holes 5, 6 makes possible the insertion of both legs of a U-bolt, which spans and grips a tube inserted in such a tube receiving means 4 at the outside of the tube, the U-bolt being tightened at the other side of the post by two nuts screwed onto the two legs respectively of the U-bolt.

Thus a rail can be connected to the post in a simple manner, and so that a rigid, moment-resistant connection results between the rail and the post. After a tube has been received in such a tube receiving means 4 and after its location by means of a U-bolt, the possibility of the rail shearing the U-bolt or of executing shearing movements in the plane of the recessed surface of the post is eliminated. By receiving and the securement of a plurality of rails or tubes additional stiffening results.

Since the post comprises two recessed surfaces 2, 3 at right angles to one another, horizontal rails or tubes extending at right angles to one another can be connected to the post so that it is held in position secure against rocking in any direction. Thus the effect is achieved of being able to produce a pen with a plurality of posts of the kind illustrated and a plurality of rails or tubes disposed in a right-angled grid pattern and situated one above the other in groups, such a post always being disposed at the crossing point of two crossing groups of rails disposed one above the other.

Interference between the tubes extending in one horizontal direction with the tubes extending in the transverse horizontal direction is excluded because the tube receiving means 4 formed in the adjacent surfaces 2, 3 are offset in height, in relation to one another, by (at least) the width of one rail or tube. Rails can, therefore be secured to the post in crossing relation if desired.

As can also be seen from the drawings, adjacent tube receiving means 4 in the surface 2 or 3 towards the upper portion of a post have a greater spacing than in the lower portion, so that, if necessary, closer rail spacings can be produced towards the bottom of the post to meet the practical requirements for a greater density and strength of pen rails in the lower region.

The production of such a post from concrete can be carried out simply by known casting methods, and reinforcing rods should be cast in the concrete as required. A slight tapering of one lateral wall is useful for assisting removal of the posts from the mould. This is illustrated at 7 in FIG. 3 and does not impair the function of the post, because the right-angle relation of the support means 4 in the surfaces 2, 3 is not impaired.

It is understood that the tube receiving means 4 do not necessarily have to be formed as recesses extending into the material of the post. They could also be constructed, for example, by means of marginal beads formed outside the actual square profile of the post cross-section. Also, contact over the full area of one side of the tube is not essential for a moment-resisting connection of tube to post such as is aimed at. It requires only a simple external shaping of the post. It is understood that, here, at least two contact regions disposed horizontally apart and fitting such a tube above and below its mid horizontal plane would suffice. For this purpose, two trunnion-like projections on the post with semi-cylindrical bearing surfaces could serve the purpose.

The latter may be an advantage, for example, if such a post is not made from concrete but is made of another material, for example hardwood, into which trunnion-like projections or other projections could be fastened.

Finally, it is not necessary for the post to comprise a pair of receiving holes 5, 6 for each securing element. As can be seen, instead of the U-bolts, other securing elements are suitable for locating a tube or rail in each tube receiving means 4. For example, a single bolt with a head, flange or hook could be used which only requires one receiving hole.

Many modifications and variations of the invention are possible in the light of the above teachings. Thus it is to be understood that within the scope of the appended claims, the invention may be practised other than as specifically described above.

What is claimed and desired to be secured by Letters Patent of the United States is:

1. A post for an animal pen installed in a livestock shed or the like having at least two outwardly facing longitudinally extending surfaces which are adjacent to one another and which extend generally in planes disposed at right angles with respect to one another, the post being made in one piece and comprising semi-cylindrically shaped recesses in each of said longitinal surfaces for receiving horizontal rigid tubular rails, said semi-cylindrical recesses having a diameter corresponding to the diameter of said tubular rails such that said semi-cylindrical recesses accommodate and seat therein semi-cylindrical portions of said tubular rails, said recesses extending transversely of said longitudinal extending surfaces and being open at both ends, said recesses being disposed in said surfaces in pairs with one recess of each pair being in one of said longitudinal surfaces and the other of said pair being in the other longitudinal surface and with the spacing between said pairs decreasing toward the bottom of said post, said recesses being offset in height with respect to one another by at least the diameter of said recesses so that a tubular rail seated in one recess of a pair of recesses will be offset from the tubular rail seated in the other recess of said pair a distance in height at least equal to the diameter of said semi-cylindrical recesses, and for each recess at least one securing hole passing through the post for receiving a securing element for securing the tubular rail in its seated position in its respective semi-cylindrical recess in said pole, thereby providing a highly rigid animal pen.

2. A post for an animal pen according to claim 1 wherein a pair of said securing holes are provided for each securing element, one of said pair of securing holes being positioned above and the other of said pair of securing holes being located below each respective semi-circular recess, whereby each pair of securing holes is adapted to accommodate a U-shaped securing element for rigidly securing said tubular rail in its respective semi-circular recess.

* * * * *